(12) United States Patent
Hira

(10) Patent No.: US 10,193,810 B2
(45) Date of Patent: Jan. 29, 2019

(54) CONGESTION-AWARE LOAD BALANCING

(71) Applicant: Nicira, Inc., Palo Alto, CA (US)

(72) Inventor: Mukesh Hira, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 54 days.

(21) Appl. No.: 15/346,569

(22) Filed: Nov. 8, 2016

(65) Prior Publication Data

US 2018/0131617 A1  May 10, 2018

(51) Int. Cl.
| | | |
|---|---|---|
| *H04L 12/803* | (2013.01) | |
| *H04L 12/801* | (2013.01) | |
| *H04L 12/931* | (2013.01) | |
| *H04L 12/933* | (2013.01) | |
| *H04L 12/707* | (2013.01) | |
| *H04L 12/741* | (2013.01) | |
| *H04L 29/08* | (2006.01) | |
| *H04L 12/26* | (2006.01) | |

(52) U.S. Cl.
CPC ............ *H04L 47/125* (2013.01); *H04L 45/24* (2013.01); *H04L 45/74* (2013.01); *H04L 47/11* (2013.01); *H04L 49/15* (2013.01); *H04L 49/70* (2013.01); *H04L 67/101* (2013.01); *H04L 43/0864* (2013.01)

(58) Field of Classification Search
CPC ... H04L 47/125; H04L 47/11; H04L 43/0888; H04L 45/24; H04L 45/74; H04L 49/15; H04L 49/70; H04L 69/16; H04L 69/22

USPC .......................................................... 370/232
See application file for complete search history.

(56) References Cited

U.S. PATENT DOCUMENTS

| | | | | |
|---|---|---|---|---|
| 7,068,667 B2* | 6/2006 | Foster | ................... | H04L 49/357 370/397 |
| 2007/0283024 A1* | 12/2007 | Landrum | ................ | H04L 67/28 709/228 |
| 2013/0100816 A1* | 4/2013 | Bergamasco | ....... | H04L 43/0864 370/237 |

* cited by examiner

*Primary Examiner* — Chi Tang P Cheng
(74) *Attorney, Agent, or Firm* — Patterson & Sheridan, LLP

(57) ABSTRACT

Certain embodiments presented herein relate to load balancing of data transmissions among a plurality of paths between endpoints (EPs) coupled to virtual switches. In particular, between the virtual switches there may be a number of physical paths for the data to be communicated between the EPs. Each path may have a different congestion level. Certain embodiments relate to selecting a path of the plurality of paths between EPs to communicate data between the EPs based on the congestion levels associated with each of the plurality of paths. In certain embodiments, a virtual switch determines a congestion level of each of the plurality of paths, selects a path of the plurality of paths based on the determined congestion level, and sets source port information of network packets to correspond to the selected path so that the network packets are communicated along the selected path.

25 Claims, 5 Drawing Sheets

CONGESTION-AWARE LOAD BALANCING

BACKGROUND

Networks (e.g., data center networks) generally employ multi-rooted topologies that are characterized by a large degree of multipathing between physical machines (e.g., physical servers) within the networks. For example, physical servers of a network may be connected with each other using a plurality of switches that provide alternative physical paths for network packet forwarding between the physical servers. A physical server may utilize one of the physical paths to send to a second physical server a flow of network packets, which can comprise one or more network packets being passed from a source (e.g., the physical server) to a destination (e.g., the second physical server). Network packets (i.e., traffic) may not be evenly distributed across the different paths, which may cause over-utilization of one path and under-utilization of another. Load balancing of network packets between paths is important to spread the network packets as evenly as possible among the paths to reduce congestion and improve network performance overall.

SUMMARY

Herein described are one or more embodiments of a method for performing congestion-aware load balancing in a network. The method includes receiving, by a virtual switch, a packet sent by a source endpoint and destined for a destination endpoint. The packet includes a header including a source address field, a destination address field, and a source port field. The source address field includes a source address of the source endpoint. The source port field includes a source port of the source endpoint. The destination address field includes a destination address of the destination endpoint. The method further includes selecting, by the virtual switch, a first path of a plurality of paths coupling the virtual switch with the destination endpoint. The first path is selected based on congestion state information associated with each of the plurality of paths. The method further includes modifying, by the virtual switch, the source address field of the header to include a source address of the virtual switch instead of the source address of the source endpoint. The method further includes modifying, by the virtual switch, the destination address field of the header to include a destination address of a second virtual switch coupled to the destination endpoint instead of the destination address of the destination endpoint. The method further includes modifying, by the virtual switch, the source port field of the header based on the selected first path. The method further includes sending, by the virtual switch, the modified packet to the destination endpoint such that the packet is forwarded via the first path based on values of the source address field, the destination address field, and the source port field of the header of the modified packet.

Also described herein are embodiments of a non-transitory computer readable medium comprising instructions to be executed in a computer system, wherein the instructions when executed in the computer system perform a method described above for performing congestion-aware load balancing in a network.

Also described herein are embodiments of a computer system, wherein software for the computer system is programmed to execute the method described above for performing congestion-aware load balancing in a network.

DETAILED DESCRIPTION

Embodiments presented herein relate to load balancing of network packets among a plurality of physical paths (e.g., including cables, wires, switches, etc.) between endpoints (EPs) coupled to virtual switches. Each path may have a different congestion level, where a more congested path may take longer to send network packets. Accordingly, embodiments presented herein relate to selecting a path to send network packets based on the congestion levels associated with each of the plurality of paths. In certain embodiments, a virtual switch determines a congestion level of each of the plurality of paths between EPs, selects a path based on the determined congestion level, and sets source port information of network packets to correspond to the selected path so that network packets are communicated along the selected path.

Figure 1:
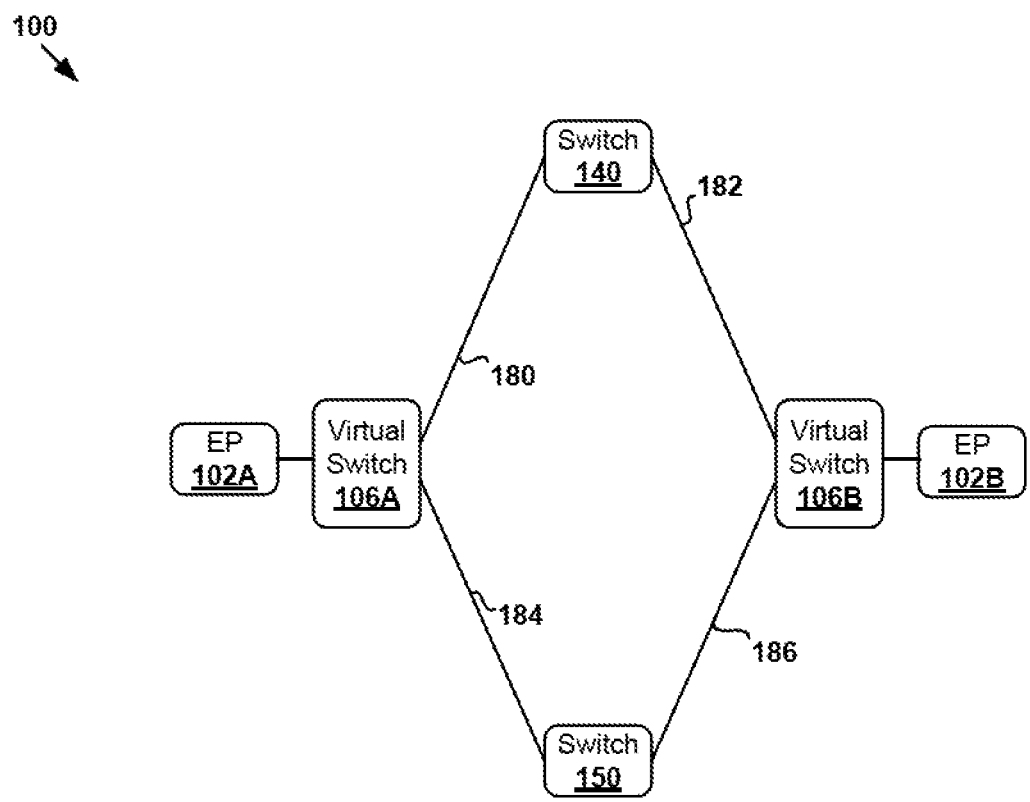
FIG. 1 is a block diagram of a network in which one or more embodiments of the present invention may be implemented.

FIG. 1 is a block diagram of a network 100 in which one or more embodiments of the present invention may be implemented. It should be understood that network 100 may include additional and/or alternative components than that shown, depending on the desired implementation. Network 100 includes a plurality of end points (EPs) 102. As shown, network 100 includes EP 102a and EP 102b, however network 100 may include additional EPs 102. An EP (e.g., EP 102) may refer generally to an originating node ("source endpoint") or terminating node ("destination endpoint") of a flow of network packets. In practice, an endpoint may be a physical computing device (e.g., physical server, physical host), virtualized computing instance (e.g., virtual machine, container (such as a Docker container), data compute node, isolated user space instance, or other logical compute node) supported by a physical computing device, etc.

Network 100 further includes a plurality of virtual switches 106 that are configured to route network packets in network 100, such as by performing layer-3 router functions, layer-2 switching, gateway functions, bridge functions, etc. As shown, network 100 includes virtual switch 106a and virtual switch 106b, however network 100 may include additional virtual switches 106. Virtual switches 106 may be implemented by a hypervisor running on a host. One or more EPs 102 and virtual switches 106 may reside on the same physical computing device, or on different computing devices.

EPs 102 send network packets to other EPs 102 via virtual switches 106. In particular, each EP 102 may be coupled to a corresponding virtual switch 106. For example, as shown, EP 102a utilizes corresponding virtual switch 106a to communicate network packets on network 100. Further, as shown, EP 102b utilizes corresponding virtual switch 106b to communicate.

In certain embodiments, the network 100 is a non-overlay network in which network packets would be encapsulated using a tunnelling protocol. Encapsulating a packet may include adding certain header information to the packet, such as addresses (e.g., internet protocol (IP) addresses), while keeping the original packet as a payload of the encapsulated packet. Encapsulating a packet maintains the information of the original packet. In the network system as presently described, virtual switches 106 may route packets based on header information in the packet without overlay network encapsulation. For example, EP 102a may generate a packet to send to EP 102b (e.g., an application running on EP 102b). The packet may include a header and a payload. The payload may include application data for EP 102b. The header may include a layer-2 header, a layer-3 header, a layer-4 header, etc. In particular, the header may include a tuple indicating a source address corresponding to the address (e.g., media access control (MAC) or IP address) of EP 102a, a destination address corresponding to the address of EP 102b, a source port corresponding to the port of EP 102a, a destination port corresponding to the port of EP 102b, and/or a protocol used for the packet. While network overlays using tunnel encapsulation can provide many benefits such as programmability, multi-tenancy, network isolation, etc., it also requires controllers and other components, adds to the overall complexity of the network topology, and increases bandwidth requirements due to stacked headers on every packet.

The term "layer-2" generally refers to a data link layer (e.g., Media Access Control (MAC) or Ethernet layer), "layer-3" to a network layer (e.g., Internet Protocol (IP) layer), and "layer-4" to a transport layer (e.g., Transmission Control Protocol (TCP) layer) in the Open System Interconnection (OSI) model, although the concepts described herein and referred to simply as "MAC" and "IP" may be applicable to corresponding layers in may be applicable to corresponding layers in other networking models. The term "packet" may refer generally to a group of bits that can be transported together, and may be in another form, such as "frame", "message", "segment", etc.

As discussed, EP 102a may communicate on network 100 via virtual switch 106a. Accordingly, virtual switch 106a receives the packet from EP 102a and routes the packet over network 100 to EP 102b.

As discussed, there may be a plurality of paths between EPs 102. In particular, there may be a plurality of paths between virtual switches 106 associated with each of EPs 102. For example, as shown, virtual switch 106a is coupled via two separate paths to switches 140 and 150. Further, virtual switch 106b is also coupled via two separate paths to switches 140 and 150. Therefore, there are two paths as shown between EP 102a/virtual switch 106a and EP 102b/virtual switch 106b: one path via switch 140 and the other path via switch 150. Depending on the network topology, switch 140 or 150 may be a ToR switch, aggregate switch, spine switch, etc. Although two alternative paths are shown in FIG. 1 for simplicity, the number of paths depends on the number of inter-connected switches and the topology of network 100, such as a multi-rooted topology (e.g., leaf-spine topology, fat-tree topology, etc.). Further, there may be additional switches connecting EP 102a/virtual switch 106a and EP 102b/virtual switch 106b than that shown in FIG. 1.

Embodiments presented herein relate to selecting a path of the plurality of paths to communicate network packets between EPs/virtual switches based on congestion levels associated with the paths. Further, as discussed, certain embodiments presented herein may be used for non-overlay network. For example, in certain embodiments, a virtual switch may be configured to modify network packets in a non-overlay network.

Path Congestion

In practice, network packets may be unevenly spread among different paths in a network such as network 100, which may cause congestion and performance degradation. In some embodiments, equal cost multipath routing (ECMP) is used as a data plane load balancing mechanism to try and spread network packets more uniformly across multiple paths with equal costs (e.g., equal number of hops for each path between EPs). In some embodiments, ECMP switches use a simple, hash-based load balancing scheme to assign each new flow of network packets to one of the available paths at random. ECMP may be implemented in custom silicon (e.g., application-specific integrated circuit (ASIC)), which may lack flexibility to update the load balancing scheme. Further, ECMP is congestion-agnostic and does not protect against oversubscription of paths that causes performance degradation. For example in FIG. 1, links 180-186 connecting different pairs of switches may have different congestion levels.

In certain embodiments, ECMP does not consider different congestion levels, and therefore, flows of network packets may be assigned to paths that are congested, which may potentially delay network packet transmission. For example, link 180 may be congested, while link 184 may not be congested. In ECMP, data between the virtual switch 106a and virtual switch 106b may be transferred on the path via switch 140 including link 180 with congestion instead of on the path via switch 150 including link 184.

In some embodiments, control plane load balancing mechanisms may be used to address the shortcomings of ECMP. In such embodiments, instead of selecting paths at random, a central controller is deployed in network 100 to collect statistics from, and push forwarding rules to, virtual switches 106 and switches 140 and 150 to implement control plane load balancing. However, since a central controller is required, control plane mechanisms are relatively slow due to high control loop latency and incapable of handling highly volatile traffic.

In some embodiments, host-based approaches may be used to address the shortcomings of ECMP. For example, a modified version of transmission control protocol (TCP) called multipath TCP (MPTCP) may be used to establish multiple subflows between endpoints to split flows of network packets over different paths. Subflows may refer to a subset of the network packets of a flow. However, certain host-based approaches may require changes to all the endpoints, such as modifying the TCP/IP stack of all EPs 102 in network 100 in the case of MPTCP. Such changes are usually challenging (and impossible in some cases), especially when EPs 102 are running different operating systems, or controlled by different entities.

Congestion-Aware Load Balancing

Accordingly, certain embodiments presented herein provide approaches to load balancing based on congestions levels in a network that overcome such deficiencies. For example, certain embodiments provide techniques for performing load balancing based on congestion levels of a network that may be implemented by a virtual switch 106. Such embodiments may not necessitate modifications to EPs 102, or even the modification of intermediate switches 140 and 150. Further, unlike control plane load balancing mechanisms, embodiments presented herein do not necessitate deployment of a central controller to perform congestion monitoring and push forwarding rules to intermediate switches.

In certain embodiments, virtual switch 106a may perform path learning to learn the possible paths for transmitting network packets to virtual switch 106b. For example, in network 100, virtual switch 106a may implement a background daemon (e.g., modeled after Paris traceroute) to send periodic probe packets to all other virtual switches 106 in network 100 to collect "traceroute" like information (e.g., pathtrace information) about all interfaces (e.g., intermediate switches) along each of the plurality of paths between virtual switch 106a and each of the other virtual switches 106. For example, the pathtrace information for a path may include the address information (e.g., IP address) of each interface along the path. For example, virtual switch 106a may receive pathtrace information for a first path via switch 140 to virtual switch 106b and for a second path via switch 150 to virtual switch 106b.

The routing of network packets on a particular path may be based on the values of the header information associated with the packet. Therefore, changing even one of the values may change the path over which the packet is routed. In order for a source virtual switch 106 to transmit a network packet to a particular destination virtual switch 106, the source address (e.g., IP address), destination address (e.g., IP address), and destination port field information of the packet may be fixed. In particular, the value of the field for the source address is the source address of the source virtual switch, the value of the field for the destination address is the destination address of the destination virtual switch, and the value of the field for the destination port is the port used by the destination virtual switch.

However, in certain embodiments, the value of the field for the source port of the packet may be altered by the source virtual switch 106, as the source virtual switch 106 may choose a source port to use for communication. Accordingly, the value of the source port field in a packet sent by the source virtual switch 106 may be altered to change the routing of the packet, meaning the path over which the packet is routed may be changed. Accordingly, in certain embodiments, a source virtual switch 106 is configured to set a particular source port value for the source port field of a header of a packet to transmit to a destination virtual switch 106 in order to select the path associated with the source port for transmitting the packet.

Virtual switch 106a may utilize the path learning technique described, along with changing source port information of network packets, to learn a plurality of paths between virtual switch 106a and virtual switch 106b. For example, virtual switch 106a may send the discussed periodic probe packets to virtual switch 106b with different source port values for the source port field of a header of different probe packets, but the same source address, destination address, destination port, and protocol field values for each probe packet and store a mapping of the collected pathtrace information to the source port value for the source port field for each path. In some embodiments, the pathtrace information may be stored as a hash to an identifier, such as a path identifier. If virtual switch 106 receives pathtrace information for a source port value that is different than the pathtrace information already stored at virtual switch 106, virtual switch 106 either adds a new mapping of the collected pathtrace information to a source port value if the source port value is not already stored as mapped to pathtrace information, or updates the pathtrace information in the stored mapping of the pathtrace information to the corresponding source port value.

In certain embodiments, virtual switch 106a may determine the congestion level of each learned path. The congestion level may comprise one or more of a round trip time (RTT), or other suitable congestion level indication. Virtual switch 106a may then store information mapping source port numbers to corresponding pathtrace information (e.g., path identifier) and congestion level information. The mapping may be stored as a table, hash, etc. The information may be referred to as congestion state information.

In certain embodiments, a virtual switch 106a may rely on capabilities of intermediate switches 140 or 150, such as Explicit Congestion Notification (ECN) that facilitates end-to-end notification of congestion level information in a network. Detailed information of ECN may be found in the Internet Engineering Task Force (IETF) Request for Comments number 3168 and entitled "The Addition of Explicit Congestion Notification (ECN) to IP," which is incorporated herein in its entirety by reference. Although ECN is described as an example, it should be understood that any other suitable packet marking approach may be used.

Figure 2:
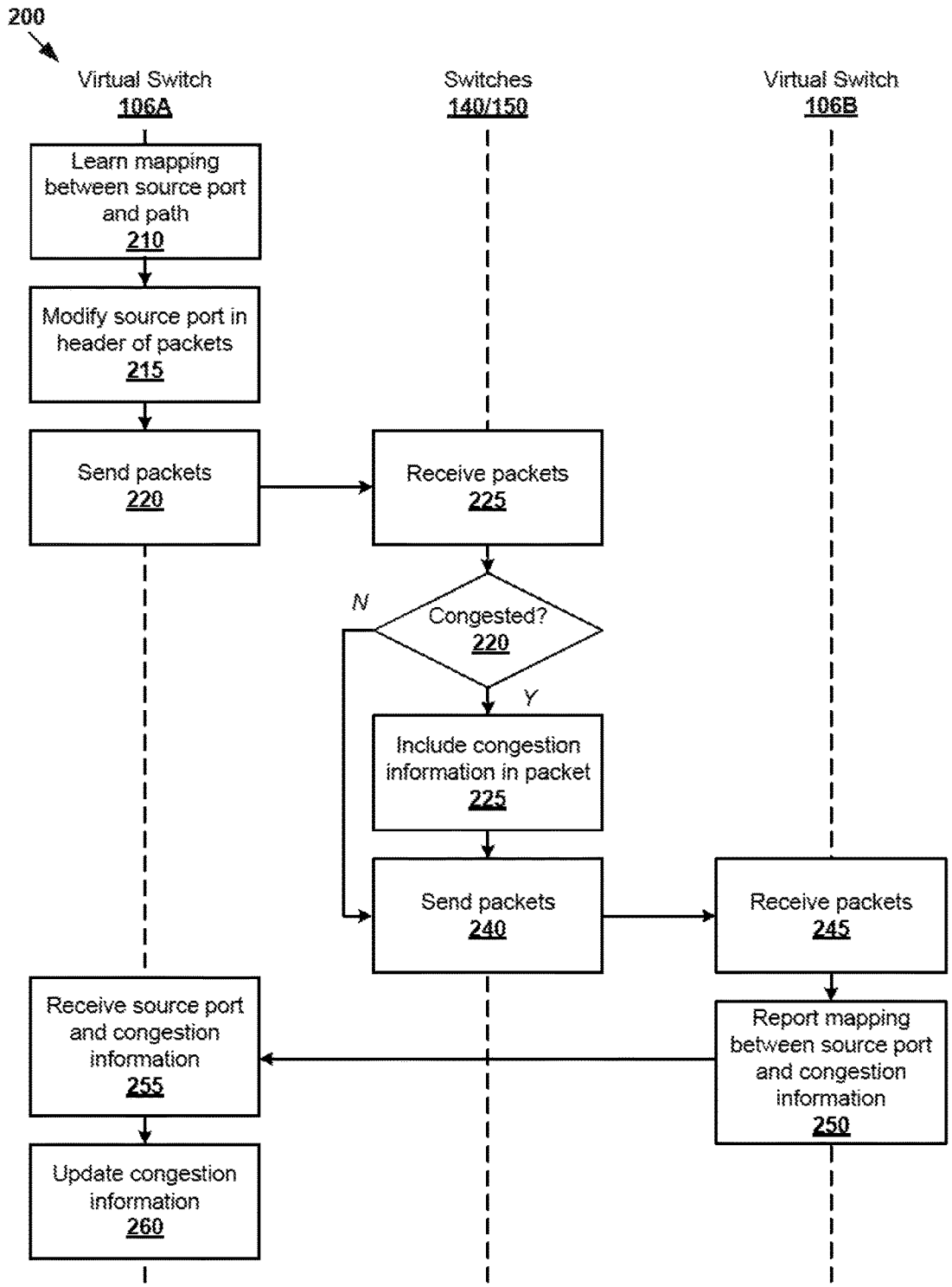
FIG. 2 illustrates example operations for performing path learning using Explicit Congestion Notification (ECN) to determine congestion level of paths in a network.

FIG. 2 illustrates example operations 200 for performing path learning using ECN to determine congestion level of paths in an overlay network.

At 210, virtual switch 106a performs path learning to learn the paths between the virtual switch 106a and virtual switch 106b and a mapping between source port numbers and pathtrace information for each path, as discussed. At 215, virtual switch 106a modifies packets to transmit to the virtual switch 106b and includes a different source port number associated with each of the learned plurality of paths in different packets. At 220, virtual switch 106a sends the packets to virtual switch 106b.

At 225, switches (e.g., virtual switches 106, intermediate switches 140, 150, etc.) along each path receive the packets. At 230, each switch determines if a link the switch is forwarding a given packet on is congested. If at 230, the switch determines the link is not congested, the operations 200 proceed to 240. Otherwise, if the switch determines the link is congested, the switch includes congestion information of the link in the given packet. For example, the switch may include information in the packet such as a flag indicating congestion or not. In some embodiments, a packet may travel through a plurality of switches along a path. Accordingly, if a packet already includes congestion information from one switch, and another intermediate switch determines there is congestion on another link, the other intermediate switch may add additional information to the packet about the congestion, may not add additional information.

At 240, the switches send the packets to virtual switch 106b. At 245, virtual switch 106b receives the packets. At 250, virtual switch 106b sends feedback information (e.g., destination to source feedback information) to virtual switch 106a that includes the congestion information and information about the path travelled by the packet (e.g., source port number of the received packet).

At 255, virtual switch 106a receives the feedback information. At 260, virtual switch 106a updates/stores the congestion information as mapped to the corresponding pathtrace information and source port number.

In another example, instead of or in addition to using ECN as indicative of congestion level, virtual switch 106a may use measured RTT for each path as a measure of congestion level of the path.

Figure 3:
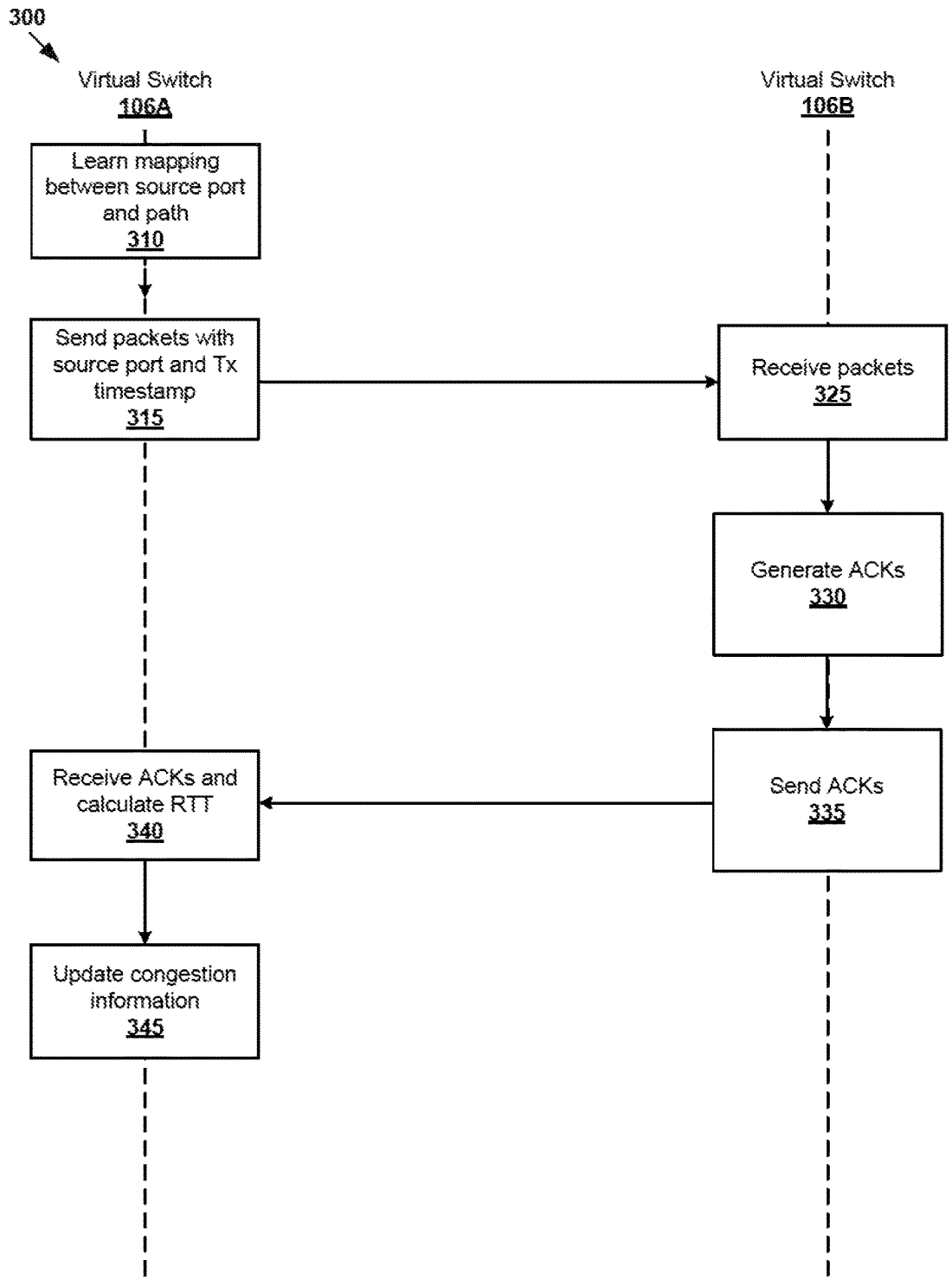
FIG. 3 illustrates example operations for performing path learning using round trip time (RTT) measurement to determine congestion level of paths.

FIG. 3 illustrates example operations for performing path learning using RTT measurement to determine congestion level of paths.

At 310, similar to 210, virtual switch 106a performs path learning to learn the paths between virtual switch 106a and virtual switch 106b as discussed. At 315, similar to 215, virtual switch 106a transmits packets including a different source port number associated with each of the learned plurality of paths in different packets and includes a transmit (Tx) timestamp in each packet to virtual switch 106b.

At 325, virtual switch 106b receives the packets. At 330, virtual switch 106b generates acknowledgement (ACK) packets acknowledging receipt of the packets from virtual switch 106a. Virtual switch 106b includes in each ACK packet information about the path travelled by the packet (e.g., source port number of the received packet) and the corresponding Tx timestamp. At 335, virtual switch 106b transmits the ACK packets to virtual switch 106a. At 340, virtual switch 106a receives the ACK packets and calculates the time differences between each Tx timestamp and the time each ACK is received as the RTT for the path associated with the source port number in the ACK packet. At 345, virtual switch 106a stores the RTT as indicative of the congestion level for the path associated with the source port number, destination address, source address, and destination port. In some embodiments, the closer that the timestamping and acknowledgment is performed to hardware network interface controllers (NICs), the more accurately the RTT reflects actual network latency for the path as it does not include latency introduced by a software stack at the transmitter and the receiver.

In certain embodiments, virtual switch 106a may select a path of a plurality of paths for transmitting a network packet to virtual switch 106b, respectively, based on the congestion level associated with each of the plurality of paths. In some embodiments, virtual switch 106a may select the path that has the lowest congestion level to transmit the packet.

In certain embodiments, load balancing, or selecting a path for transmitting packets from a particular virtual switch 106 to another may be done on any granularity level. For example, different paths may be selected for each packet, each flow, or each flowlet. A flowlet may refer to a group or burst of packets within a flow. In some embodiments, load balancing may be performed at the flowlet level, such as to avoid or ameliorate packet reordering issues associated with transport layer protocols such as TCP.

Figure 4:
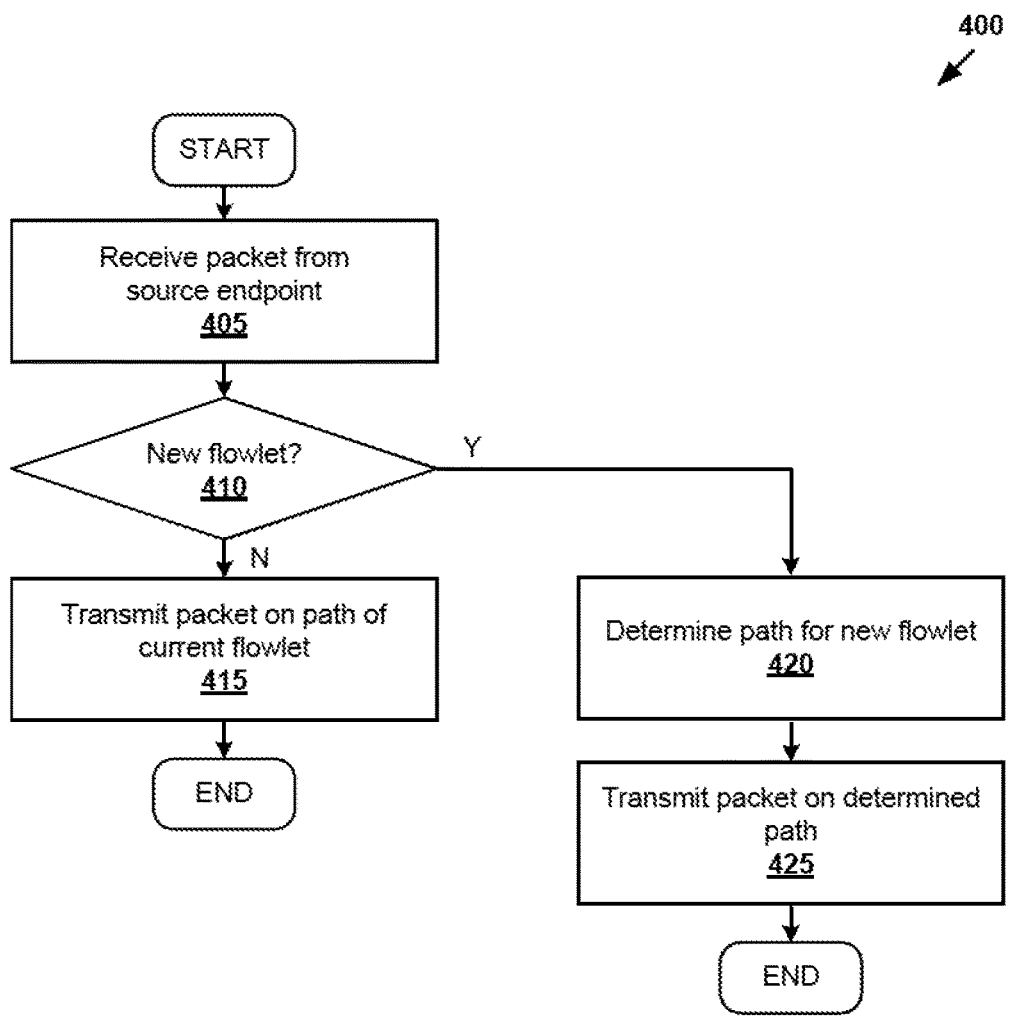
FIG. 4 illustrates example operations for performing load balancing at a flowlet level.

FIG. 4 illustrates example operations for performing load balancing at a flowlet level. At 405, virtual switch 106a receives a network packet from EP 102a to transmit to EP 102b. At 410, virtual switch 106a determines if the network packet belongs to a new flowlet or a current flowlet between EP 102a and EP 102b. For example, if there is no existing flow between EP 102a and EP 102b that the network packet corresponds to, then the network packet belongs to a new flow, and accordingly, a new flowlet. If there is an existing flow between EP 102a and EP 102b that the network packet corresponds to, virtual switch 106a determines if the network packet belongs to the current flowlet. In particular, if the network packet is received by virtual switch 106a from EP 102a within a threshold time period (e.g., predetermined time period in seconds, based on estimated RTT in the network 100, etc.) of virtual switch 106a receiving the last packet from EP 102a of the current flowlet, the network packet belongs to the current flowlet. Otherwise, the network packet belongs to a new flowlet. All subsequent packets that are received by the virtual switch 106a of the flow that do not exceed the threshold time period are also considered part of the same flowlet. A larger threshold time period may reduce packet reordering.

If at 410, virtual switch 106a determines the received network packet is part of the current flowlet, at 415, virtual switch 106a may transmit the network packet on the same path as the network packets of the current flowlet. If at 410, virtual switch 106a determines the received network packet is part of a new flowlet, at 420, virtual switch 106a may determine a path of a plurality of paths to transmit the network packet based on congestion levels associated with the plurality of paths. Then, at 425, virtual switch 106a may transmit the network packet on the determined path. In some embodiments, virtual switch 106a may keep track of the time between receiving packets of flowlets using counters. In some embodiments, virtual switch 106a may further keep track of the paths associated with flowlets by associating an identifier with each flowlet and storing the identifier in the mapping to source port numbers, such as in the stored congestion state information.

Certain embodiments presented herein may be implemented independent of any configuration of end-user guest virtual machines (e.g., acting as EPs 102) by configuring virtual switches 106 to split a network flow into multiple uncongested paths in a manner independent of the guest virtual machines. In particular, the logic for splitting flows into flowlets may be implemented at the source and destination virtual switches 106. In such embodiments, a flow may be divided into flowlets arbitrarily, and not contingent upon any threshold time period between packets.

For example, in some embodiments, each TCP segmentation offload (TSO) segment of a flow may be treated as a flowlet. In some embodiments, if flowlets arrive out of order at the destination virtual switch because of the different paths taken, the destination virtual switch may reorder the flowlets before delivering them to the destination endpoint (e.g., guest virtual machine). This allows the destination virtual switch to hide the out-of-order arrival from the destination protocol stack (e.g., TCP/IP stack) of the destination endpoint, preventing the destination protocol stack from slowing down the source protocol stack at the source endpoint due to the out-of-order delivery.

As discussed, in certain embodiments, a source virtual switch 106 is configured to set a particular source port value for a source port field of a header of a packet to transmit to a destination virtual switch 106 in order to select the path associated with the source port value/number for transmitting the packet.

Unlike in an overlay network, virtual switches 106 in a non-overlay network are not configured to encapsulate packets. Instead, virtual switches 106 may typically be configured to forward network packets received from EPs 102 as is, including the header information generated by EPs 102. As discussed, without changing the header information of a network packet (e.g., the source port field) the network packet may only be able to travel on one path, instead of a particular path based on congestion level. Accordingly, certain embodiments described herein modify the function of virtual switches 106 to allow virtual switches 106 to change header information of a network packet to select a path of a plurality of paths to send the network packet based on the congestion level of the plurality of paths.

Figure 5:
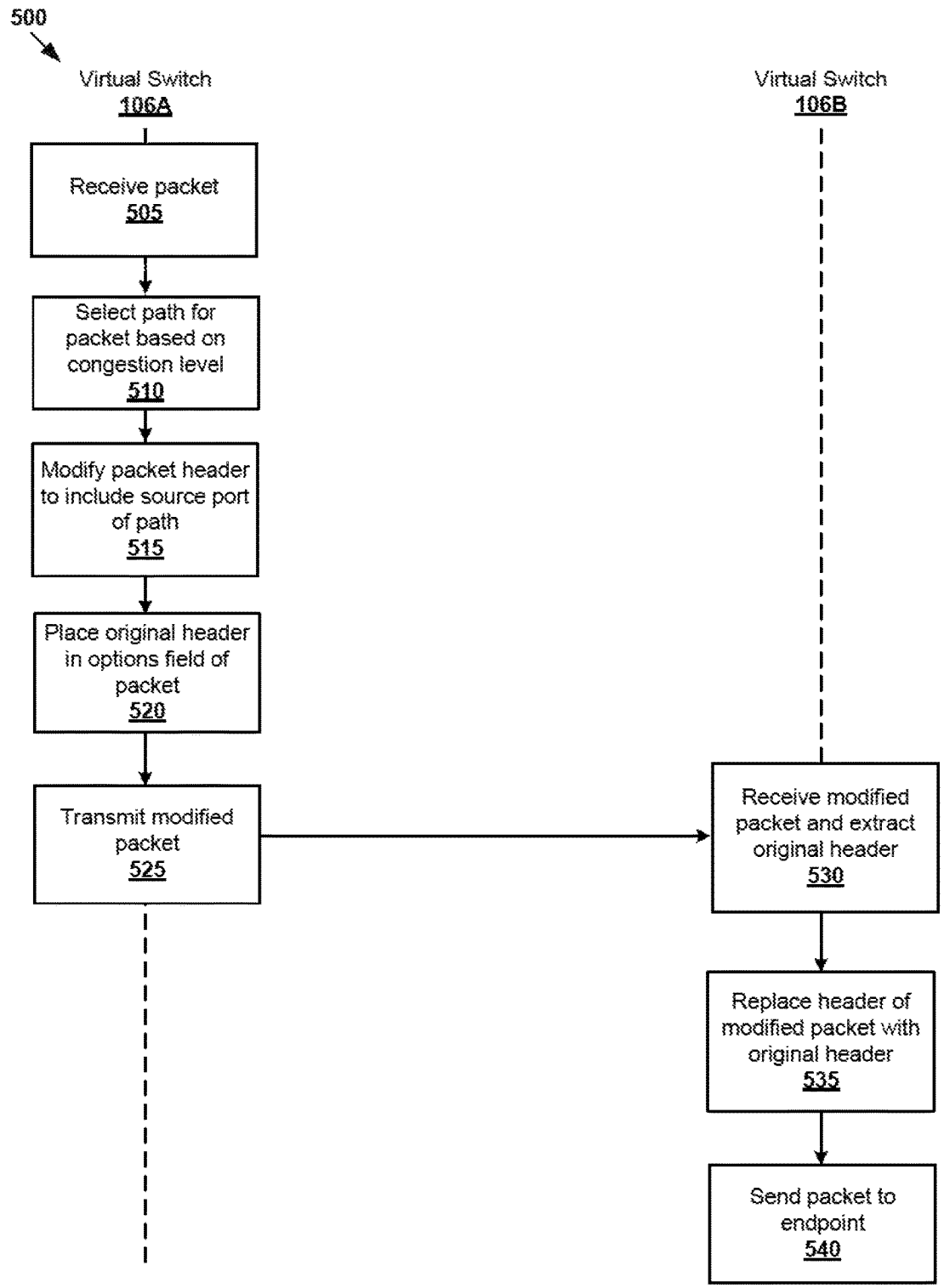
FIG. 5 illustrates example operations for modifying a packet to select a path to transmit the packet in a network.

FIG. 5 illustrates example operations 500 for modifying a packet to select a path to transmit the packet in a network (e.g., non-overlay network).

At 505, virtual switch 106a receives a network packet from EP 102a to transmit to EP 102b. At 510, virtual switch 106a selects a path to send the network packet to virtual switch 106b associated with EP 102b based on the congestion level of the plurality of paths. At 515, virtual switch 106a replaces the original header information in the packet with modified header information. In particular, virtual switch 106a replaces the source address included in the source address field of the header of the packet with the source address of virtual switch 106a (e.g., the hypervisor implementing virtual switch 106a), the destination address included in the destination address field of the header of the packet with the destination address of virtual switch 106b (e.g., the hypervisor implementing virtual switch 106b), the destination port included in the destination port field of the header of the packet with a fixed value in the ephemeral port range (e.g., where the fixed value is known by the virtual switch 106b), and the source port number included in the source port field of the header of the packet with the source port number associated with the selected path, such as based on congestion state information stored at virtual switch 106a. In some embodiments, the virtual switch 106b determines that the packet is a modified packet based on the destination port field including the fixed value. Further, at 520, virtual switch 106a places a portion of the original header information including the original source address, destination address, destination port, and source port information included by EP 102a in the packet in a TCP options field of the packet. At 525, virtual switch 106a then transmits the modified packet to EP 102b. The packet travels over the selected path based on the modified header information of the packet. At 530, virtual switch 106b receives the packet and extracts the original source address, destination address, destination port, and source port information from the TCP options field of the packet. In some embodiments, the virtual switch 106b determines that the received packet has a destination port field including the fixed value and is therefore a modified packet. Accordingly, in some embodiments, the virtual switch 106b extracts the original header information (e.g., at 530) and replaces the modified header information (e.g., at 535) based on the value of the destination port field of the received packet. At 535, virtual switch 106b replaces the modified header information (e.g., source address field, destination address field, destination port, and source port field) with the original header information (e.g., source address field, destination address field, destination port, and source port field) from the TCP options field. At 540, virtual switch 106b sends the packet to EP 102b based on the original header of the packet. Accordingly, virtual switches 106 can select a path for transmitting a network packet by selecting a source port number to include in a header of the packet.

Embodiments described herein may be deployed in a virtual switch of a hypervisor leading to intelligent path selection from the first point of entry of traffic. For example, there could be multiple ECMP paths from the virtual switch onwards, each path using a different physical NIC. In scenarios where all physical NICs connect to the same layer-3 next-hop and path diversity starts beyond the first-hop switch (e.g., ToR switch), examples of the described herein may be implemented in the NIC driver/hardware or on the first-hop switch at faster speeds than in the virtual switch software. Compared to conventional approaches that require advanced switch architectures, examples of the described herein may be performed in the edge hypervisor (e.g., entirely in software) and scale to any number of hops between sources and destinations.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for performing congestion-aware load balancing in a network, the method comprising:
   receiving, by a virtual switch running as software on a first physical host machine, a packet sent by a source endpoint at the first physical host machine and destined for a destination endpoint at a second physical host machine, the packet comprising a header comprising a source address field, a destination address field, and a source port field, wherein the source address field comprises a source address of the source endpoint, the source port field comprises a source port of the source endpoint, and the destination address field comprises a destination address of the destination endpoint;
   selecting, by the virtual switch, a first physical path of a plurality of physical paths coupling the virtual switch with the destination endpoint over a physical network, wherein the first physical path is selected based on congestion state information indicating congestion on each of the plurality of physical paths;
   modifying, by the virtual switch, the source address field of the header to include a source address associated with the first physical host machine and not the source endpoint instead of the source address of the source endpoint;
   modifying, by the virtual switch, the destination address field of the header to include a destination address associated with the second physical host machine and not the destination endpoint instead of the destination address of the destination endpoint;
   modifying, by the virtual switch, the source port field of the header based on the selected first physical path; and
   sending, by the virtual switch, the modified packet to the destination endpoint via a second virtual switch running as software on the second physical host machine such that the packet is forwarded via the first physical path based on a value of the source address field being a source address associated with the first physical host machine and not the source endpoint, a value of the destination address field being a destination address associated with the second physical host machine and not the destination endpoint, and a value of the source port field being based on the selected first physical path.

2. The method of claim 1, wherein the congestion state information is collected using a plurality of intermediate switches.

3. The method of claim 1, further comprising including in the modified packet the source address of the source endpoint, the source port of the source endpoint, and the destination address of the destination endpoint.

4. The method of claim 3, further comprising including in a Transmission Control Protocol (TCP) options field of the source address of the source endpoint, the source port of the source endpoint, and the destination address of the destination endpoint.

5. The method of claim 3, further comprising:
   receiving, by the second virtual switch, the modified packet;
   replacing, by the second virtual switch, the value of the source address field of the modified packet with the source address of the source endpoint;
   replacing, by the second virtual switch, the value of the destination address field of the modified packet with the destination address of the destination endpoint;
   replacing, by the second virtual switch, the value of the source port field of the modified packet with the sources port of the source endpoint; and
   sending, by the second virtual switch, the modified packet with the replaced values to the destination endpoint.

6. The method of claim 1, wherein the congestion state information comprises a round trip time.

7. The method of claim 1, further comprising sending a plurality of packets corresponding to a flowlet of a flow of packets via the first physical path based on selecting the first physical path.

8. The method of claim 1, further comprising learning the relationship between the plurality of physical paths and source port values.

9. A non-transitory computer readable medium comprising instructions to be executed in a computer system, wherein the instructions when executed in the computer system perform a method for performing congestion-aware load balancing in a network, the method comprising:

receiving, by a virtual switch running as software on a first physical host machine, a packet sent by a source endpoint at the first physical host machine and destined for a destination endpoint at a second physical host machine, the packet comprising a header comprising a source address field, a destination address field, and a source port field, wherein the source address field comprises a source address of the source endpoint, the source port field comprises a source port of the source endpoint, and the destination address field comprises a destination address of the destination endpoint;

selecting, by the virtual switch, a first physical path of a plurality of physical paths coupling the virtual switch with the destination endpoint over a physical network, wherein the first physical path is selected based on congestion state information indicating congestion each of the plurality of physical paths;

modifying, by the virtual switch, the source address field of the header to include a source address associated with the first physical host machine and not the source endpoint instead of the source address of the source endpoint;

modifying, by the virtual switch, the destination address field of the header to include a destination address associated with the second physical host machine and not the destination endpoint instead of the destination address of the destination endpoint;

modifying, by the virtual switch, the source port field of the header based on the selected first physical path; and sending, by the virtual switch, the packet to the destination endpoint via a second virtual switch running as software on the second physical host machine such that the packet is forwarded via the first physical path based on a value of the source address field being a source address associated with the first physical host machine and not the source endpoint, a value of the destination address field being a destination address associated with the second physical host machine and not the destination endpoint, and a value of the source port field being based on the selected first physical path.

10. The computer readable medium of claim 9, wherein the congestion state information is collected using a plurality of intermediate switches.

11. The computer readable medium of claim 9, wherein the method further comprises including in the modified packet the source address of the source endpoint, the source port of the source endpoint, and the destination address of the destination endpoint.

12. The computer readable medium of claim 11, wherein the method further comprises including in a Transmission Control Protocol (TCP) options field of the source address of the source endpoint, the source port of the source endpoint, and the destination address of the destination endpoint.

13. The computer readable medium of claim 11, wherein the method further comprises:
  receiving, by the second virtual switch, the modified packet;
  replacing, by the second virtual switch, the value of the source address field of the modified packet with the source address of the source endpoint;
  replacing, by the second virtual switch, the value of the destination address field of the modified packet with the destination address of the destination endpoint;
  replacing, by the second virtual switch, the value of the source port field of the modified packet with the sources port of the source endpoint; and
  sending, by the second virtual switch, the modified packet with the replaced values to the destination endpoint.

14. The computer readable medium of claim 9, wherein the congestion state information comprises a round trip time.

15. The computer readable medium of claim 9, wherein the method further comprises sending a plurality of packets corresponding to a flowlet of a flow of packets via the first physical path based on selecting the first physical path.

16. The computer readable medium of claim 9, wherein the method further comprises learning the relationship between the plurality of physical paths and source port values.

17. A computer system, wherein system software for the computer system is programmed to execute a method for performing congestion-aware load balancing in a network, said method comprising:
  receiving, by a virtual switch running as software on a first physical host machine, a packet sent by a source endpoint at the first physical host machine and destined for a destination endpoint at a second physical host machine, the packet comprising a header comprising a source address field, a destination address field, and a source port field, wherein the source address field comprises a source address of the source endpoint, the source port field comprises a source port of the source endpoint, and the destination address field comprises a destination address of the destination endpoint;
  selecting, by the virtual switch, a first physical path of a plurality of physical paths coupling the virtual switch with the destination endpoint over a physical network, wherein the first physical path is selected based on congestion state information indicating congestion on each of the plurality of physical paths;
  modifying, by the virtual switch, the source address field of the header to include a source address associated with the first physical host machine and not the source endpoint instead of the source address of the source endpoint;
  modifying, by the virtual switch, the destination address field of the header to include a destination address associated with the second physical host machine and not the destination endpoint instead of the destination address of the destination endpoint;
  modifying, by the virtual switch, the source port field of the header based on the selected first physical path; and
  sending, by the virtual switch, the packet to the destination endpoint via a second virtual switch running as software on the second physical host machine such that the packet is forwarded via the first physical path based on a value of the source address field being a source address associated with the first physical host machine and not the source endpoint, a value of the destination address field being a destination address associated with the second physical host machine and not the destination endpoint, and a value of the source port field being based on the selected first physical path.

18. The computer system of claim 17, wherein the congestion state information is collected using a plurality of intermediate switches.

19. The computer system of claim 17, wherein the method further comprises including in the modified packet the source address of the source endpoint, the source port of the source endpoint, and the destination address of the destination endpoint.

20. The computer system of claim 19, wherein the method further comprises including in a Transmission Control Protocol (TCP) options field of the source address of the source endpoint, the source port of the source endpoint, and the destination address of the destination endpoint.

21. The computer system of claim 19, wherein the method further comprises:
   receiving, by the second virtual switch, the modified packet;
   replacing, by the second virtual switch, the value of the source address field of the modified packet with the source address of the source endpoint;
   replacing, by the second virtual switch, the value of the destination address field of the modified packet with the destination address of the destination endpoint;
   replacing, by the second virtual switch, the value of the source port field of the modified packet with the sources port of the source endpoint; and
   sending, by the second virtual switch, the modified packet with the replaced values to the destination endpoint.

22. The computer system of claim 17, wherein the congestion state information comprises a round trip time.

23. The computer system of claim 17, wherein the method further comprises sending a plurality of packets corresponding to a flowlet of a flow of packets via the first physical path based on selecting the first physical path.

24. The computer system of claim 17, wherein the method further comprises learning the relationship between the plurality of physical paths and source port values.

25. A computer system comprising:
   means for receiving, by a virtual switch running as software on a first physical host machine, a packet sent by a source endpoint at the first physical host machine and destined for a destination endpoint at a second physical host machine, the packet comprising a header comprising a source address field, a destination address field, and a source port field, wherein the source address field comprises a source address of the source endpoint, the source port field comprises a source port of the source endpoint, and the destination address field comprises a destination address of the destination endpoint;
   means for selecting, by the virtual switch, a first physical path of a plurality of physical paths coupling the virtual switch with the destination endpoint over a physical network, wherein the first physical path is selected based on congestion state information indicating congestion on each of the plurality of physical paths;
   means for modifying, by the virtual switch, the source address field of the header to include a source address associated with the first physical host machine and not the source endpoint instead of the source address of the source endpoint;
   means for modifying, by the virtual switch, the destination address field of the header to include a destination address associated with the second physical host machine and not the destination endpoint instead of the destination address of the destination endpoint;
   means for modifying, by the virtual switch, the source port field of the header based on the selected first physical path; and
   means for sending, by the virtual switch, the packet to the destination endpoint via a second virtual switch running as software on the second physical host machine such that the packet is forwarded via the first physical path based on a value of the source address field being a source address associated with the first physical host machine and not the source endpoint, a value of the destination address field being a destination address associated with the second physical host machine and not the destination endpoint, and a value of the source port field being based on the selected first physical path.

* * * * *